United States Patent

Mestha et al.

[11] Patent Number: 5,963,244
[45] Date of Patent: Oct. 5, 1999

[54] OPTIMAL RECONSTRUCTION OF TONE REPRODUCTION CURVE

[75] Inventors: Lingappa K. Mestha, Fairport; Yao Rong Wang, Webster; Sohail A. Dianat, Pittsford, all of N.Y.; Pramod P. Khargonekar; Daniel E. Koditschek, both of Ann Arbor, Mich.; Eric Jackson, Rochester; Tracy E. Thieret, Webster, both of N.Y.

[73] Assignee: Xerox Corporation, Stamford, Conn.

[21] Appl. No.: 08/754,561

[22] Filed: Nov. 21, 1996

[51] Int. Cl.⁶ ........................................................ B41J 2/47
[52] U.S. Cl. .................................................... 347/251
[58] Field of Search .................................. 347/115, 232, 347/251, 240; 358/512, 518

[56] References Cited

U.S. PATENT DOCUMENTS

| | | |
|---|---|---|
| 4,698,669 | 10/1987 | Sekisawa et al. ........................ 358/509 |
| 5,018,008 | 5/1991 | Asada ........................................ 358/518 |
| 5,315,413 | 5/1994 | Yamamoto et al. ..................... 358/512 |
| 5,450,165 | 9/1995 | Henderson ................................ 399/49 |
| 5,771,311 | 6/1998 | Arai ......................................... 382/162 |

*Primary Examiner*—N. Le
*Assistant Examiner*—Hai C. Pham
*Attorney, Agent, or Firm*—Ronald F. Chapuran

[57] ABSTRACT

A method of machine control including the recreation of a tone reproduction curve by providing a look up table. The look up table incorporates a covariance matrix of elements containing n tone reproduction samples. A matrix multiplier responds to sensed developed patch samples and to the look up table to reproduce a complete tone reproduction curve. A control reacts to the reproduced tone reproduction curve to adjust machine quality.

18 Claims, 3 Drawing Sheets

OPTIMAL RECONSTRUCTION OF TONE REPRODUCTION CURVE

BACKGROUND OF THE INVENTION

The invention relates to xerographic process control, and more particularly, to the optimal reconstruction of tone reproduction curves for development control.

In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a "densitometer", is disposed along the path of the photoreceptor, directly downstream of the developer. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch.

Xerographic test patches are traditionally printed in the interdocument zones on the photoreceptor. They are used to measure the deposition of toner on paper to measure and control the tone reproduction curve (TRC). Generally each patch is about an inch square that is printed as a uniform solid half tone or background area. This practice enables the sensor to read one value on the tone reproduction curve for each test patch. However, that is insufficient to complete the measurement of the entire curve at reasonable intervals, especially in a multi-color print engine. To have an adequate number of points on the curve, generally multiple test patches have to be created.

Thus, the traditional method of process controls involves scheduling solid area, uniform halftones or background in a test patch. Some of the high quality printers contain many test patches. During the print run, each test patch is scheduled to have single halftone that would represent a single byte value on the tone reproduction curve. This is a complicated way to increase the data bandwidth required for the process control loops. It also consumes customer toner for printing many test patches.

To achieve a high quality image, the entire TRC of the image to be printed or copied must be maintained by the controls system of the printer/copier. The TRC of the printed/copied image is affected by several variables, including changes in the environmental conditions such as humidity, temperature, and uncontrolled changes in the xerographic elements, such as the photoreceptor, laser and developer material.

It is known in pending application Ser. No. 08/527,616 filed Sep. 13, 1995, to provide a single test pattern, having a scale of pixel values, in the interdocument zone of the imagining surface and to be able to respond to the sensing of the test pattern and a reference tone reproduction curve to adjust the machine operation for print quality. In addition, U.S. Pat. No. 5,450,165 discloses the use of incoming data or customer image data as a test patch. In particular, incoming data is polled for preselected density conditions to be used for test patches to monitor print quality. It is also known in the prior art to use a constraint imposed cubic spline curve fitting interpolation routine to reconstruct a tone reproduction curve.

A main difficulty with the prior art is the inability to adequately determine a tone reproduction curve without an inordinate number of test patches or samples. Also, attempts to recreate a tone reproduction curve or interpolate points on a tone reproduction curve, have not provided the required accuracy. In particular, a cubic spline curve fitting routine blindly interpolates data points without knowledge of the system being controlled. Accuracy of interpolation increases with an increase in the number of data points, but this also leads to an increased number of patches. The use of multiple test patches, independent of the actual images to be printed, unnecessarily depletes the system of toner and adds to the complexity of control. Another difficulty in the prior art, such as disclosed in U.S. Pat. No. 5,450,165 is the need to poll incoming data for preselected density conditions, such as various halftone conditions, to be used for test patches to monitor print quality.

It would be desirable, therefore, to be able to use an in depth knowledge of a system to be able to accurately reconstruct an entire tone reproduction curve, as well as to be able to eliminate the need for multiple test patches.

It is an object of the present invention therefore to provide a new and improved technique for process control, in particular, for recreating an entire tone reproduction curve. It is another object of the present invention to provide the use of a least square optimal reconstruction technique to reconstruct a developability curve or other related data for the purpose of local/remote diagnostics. It is another object of the present invention to use a precalculated look up table that can be stored within a sensor to reconstruct a tone reproduction curve. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of machine control including the recreation of a tone reproduction curve by providing a look up table for reconstructing the tone reproduction curve. The look up table incorporates a covariance matrix of elements containing n tone reproduction samples. A matrix multiplier responds to sensed developed patch samples and to the look up table to reproduce a complete tone reproduction curve. A control reacts to the reproduced tone reproduction curve to adjust machine quality.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
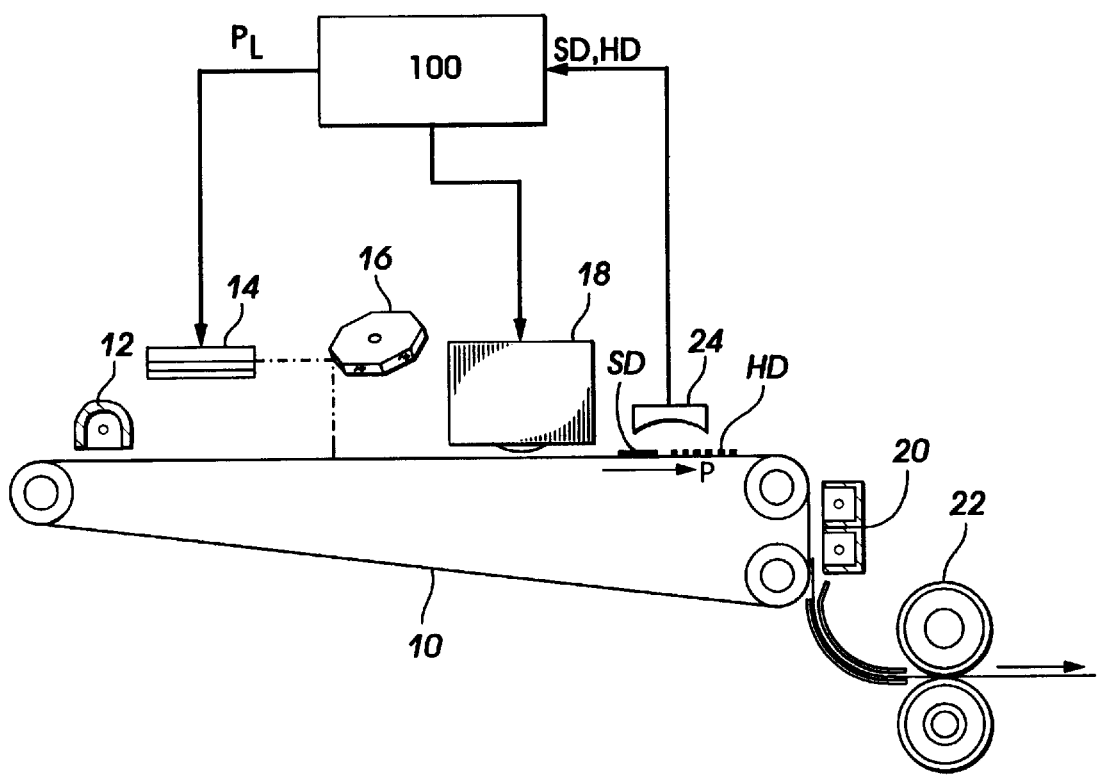
FIG. 1 is an elevational view illustrating a typical electronic imaging system incorporating tone reproduction curve control in accordance with the present invention.

FIG. 1 shows the basic elements of the well-known system by which an electrophotographic printer or laser printer uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move (by means such as a motor, not shown) through process direction P. Moving from left to right in FIG. 1, there is illustrated the basic series of steps by which an electrostatic latent image according to a desired image to be printed is created on the photoreceptor 10, subsequently developed with dry toner, and transferred to a sheet of plain paper.

The first step in the electrophotographic process is the general charging of the relevant photoreceptor surface. As seen at the far left of FIG. 1, this initial charging is performed by a charge source known as a "scorotron", indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises laser source 14 and a rotatable mirror 16 which act together, in a manner known in the art, to discharge certain areas of the charged photoreceptor 10. Although a laser source is shown to selectively discharge the charge-retentive surface, other apparatus that can be used for this purpose include an LED bar, or, conceivably, a light-lens system. The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam of laser power PL which charges or discharges the exposed surface on photoreceptor 10, in accordance with the specific machine design.

After certain areas of the photoreceptor 10 are (in this specific instance) discharged by the laser source 14, remaining charged areas are developed by a developer unit such as 18 causing a supply of dry toner to contact the surface of photoreceptor 10. The developed image is then advanced, by the motion of photoreceptor 10, to a transfer station including a transfer scorotron such as 20, which causes the toner adhering to the photoreceptor 10 to be electrically transferred to a print sheet, which is typically a sheet of plain paper, to form the image thereon. The sheet of plain paper, with the toner image thereon is then passed through a fuser 22, which causes the toner to melt, or fuse, into the sheet of paper to create the permanent image.

The idea of "print quality" can be quantified in a number of ways, but two key measurements of print quality are (1) the solid area density, which is the darkness of a representative developed area intended to be completely covered by toner and (2) a halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used. Both the solid area and halftone density may be readily measured by optical sensing systems which are familiar in the art. As shown, a densitometer generally indicated as 24 is here used after the developing step to measure the optical density of a solid density test patch ( marked SD) or a halftone density test patch (HD) created on the photoreceptor 10 in a manner known in the art. Systems for measuring the true optical density of a test patch are shown in, for example, U.S. Pat. No. 4,989,985 or U.S. Pat. No. 5,204,538, both assigned to the assignee hereof and incorporated by reference herein. However, the word "densitometer" is intended to apply to any device for determining the density of print material on a surface, such as a visible-light densitometer, an infrared densitometer, an electrostatic voltmeter, or any other such device which makes a physical measurement from which the density of print material may be determined. Various sensor and switch data such as from densitometer 24 is conveyed to controller 100 which in turn responds to monitored data to control various elements of the machine being controlled.

In accordance with the present invention, the optimal reconstruction technique requires a prior knowledge of the physical system or machine being controlled. In case of TRC reconstruction, it is necessary to sample all the points on the TRC for expected domain of operation in the actuator space. For example, if the concern is with the reconstruction of the TRC for the control of xerography, in which, for example, three actuators (unexposed photoreceptor charge, average beam power of the laser, and the donor roll voltage are used as knobs for varying the system state, then the TRC curves have to be sampled for that actuator space. This can be done by conducting various input-output experiments. First, there is disclosed the method to generate the lookup table from input-output experiments. Then there will be a discussion of the experimentation conducted to test the approach.

Let us denote the matrix resulting from a N set of output TRC measurements, as $$\Omega := [C_1 \ C_2 \ \ldots \ C_N] \epsilon R^{n \times N}, \quad (1)$$

where $C_1, C_2 \ldots$ etc., are the vectors of elements containing the n TRC samples that is covering the whole TRC space. In our experiments we used n=110 data samples in each TRC vector. Let us define an associated (non-central) sample covariance matrix as follows.

$$\Sigma := {}^{1+i}/_N \Omega \Omega^T, \quad (2)$$

If we consider three fixed set of sample points, then the TRC vector , c, with three elements can be written as, $$c := \Pi^T C \quad (3)$$

where each column of Π is a vector of zeros with a single unity value stuck in the slot corresponding to the quantized value at which the TRC is to be sampled, and c corresponds to all the elements (110 in our example) of the TRC.

However, in general, given any projection $\pi$, as in equation 3 above, there is a least squares optimal reconstruction, $\Pi^+$, with the property of best reconstructing (with respect to some set of N sample vectors) that form the columns of $\Omega$. That is, the estimated linear reconstructions can be written in terms of $\Pi^+$ as follows.

$$\hat{C} := \Pi^+ c \tag{4}$$

or $$\hat{C} := \Pi^+ \Pi^T C \tag{5}$$

The term, $\Pi^+$ can be obtained by minimizing the Frobenius norm of $$\Omega - \Pi^+ \Pi^T \Omega. \tag{6}$$

Using standard facts from linear algebra, $$\Pi^+ = \Sigma \Pi (\Pi^T \Sigma \Pi)^{-1}. \tag{7}$$

Now, the $\Pi^+$ matrix is the lookup table that we are interested to use as the sensor complement in the TRC reconstruction process in conjunction with equation 4 above. Clearly, the method described above is the least squares optimal approach to reconstructing the TRC from few fixed samples.

Figure 2:
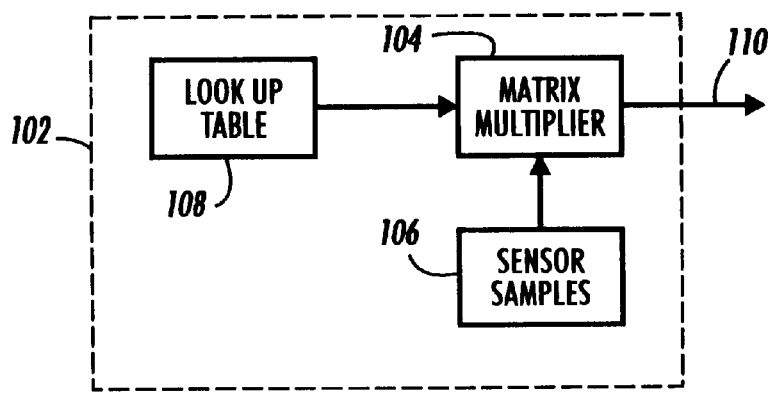
FIG. 2 is a schematic representation of a smart sensor or TRC reconstructor in accordance with the present invention.

FIG. 2 illustrates a smart sensor or TRC reconstructor defined by the dotted block at 102, in accordance with the present invention. In particular, a matrix multiplier 104 responds to sensor samples 106 and the look up table 108 to produce a reconstructed tone reproduction curve, illustrated at arrow 110. The look up table 108 represents the equation $\Pi^+ = \Sigma \Pi (\Pi^T \Sigma \Pi)^{-1}$ and the matrix multiplier 104 represents the equation $\hat{C} := \Pi^+ c$ defined above. It should be understood that these equations are stored in logic in any suitable memory such as NVM or ROM. It should also be understood that look up table 108 and matrix multiplier 104 can be part of a sensor system in the machine such as illustrated by sensor 24 in FIG. 1 or could be stored in suitable memory in a controller such as controller 100. In either situation, controller 100 responds to the reconstructed TRC to adjust appropriate elements such as scorotron 12, laser source 14, and developer 18.

To generate a look up table($\Pi^+$ matrix) and validate the method, a highlight color commercial printer was modified for experimental work. Prints were made at each of the 125 combinations of five input settings for the three actuators. Of these 125 experiments, results of four were discarded because of experimental failures, leaving a total of N=121 TRCs.

Figure 3:
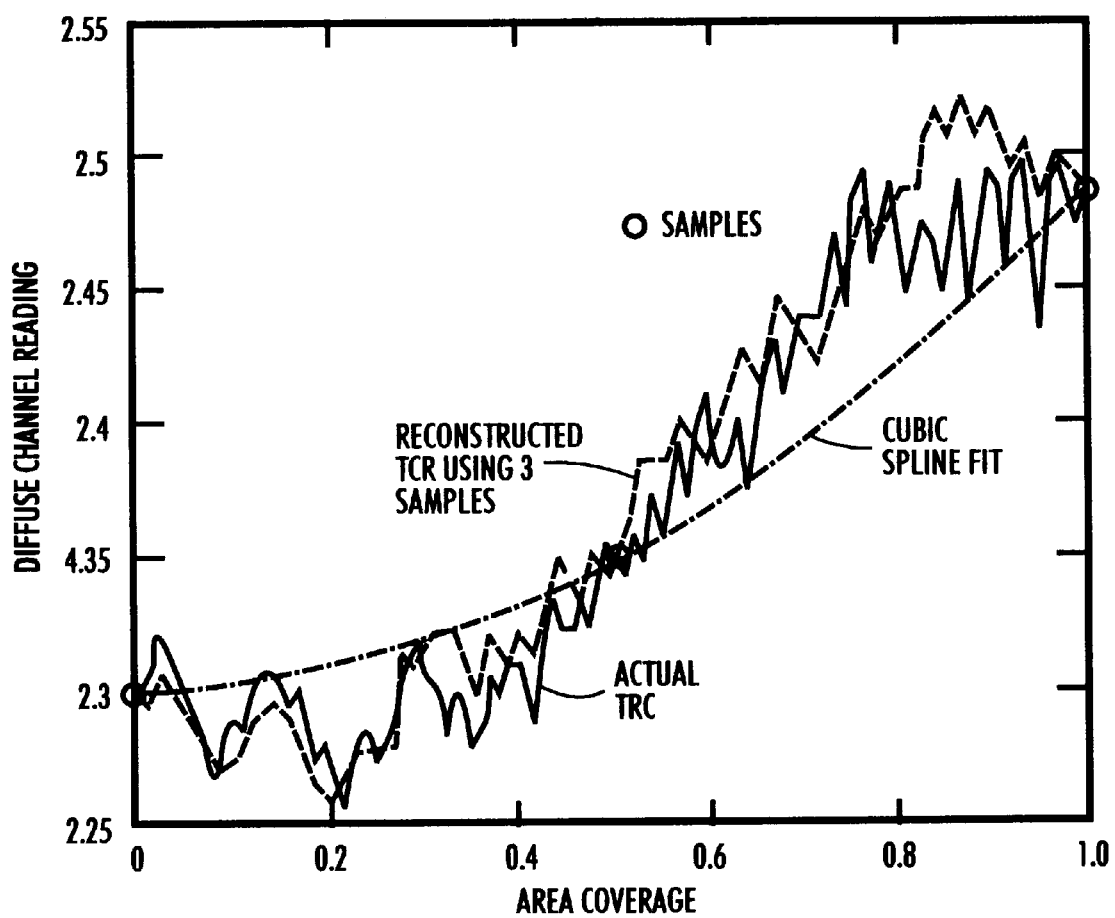
FIG. 3 is a first example of reconstructed TRC in accordance with the present invention compared to an actual TRC and a cubic spline fit TRC.
Figure 4:
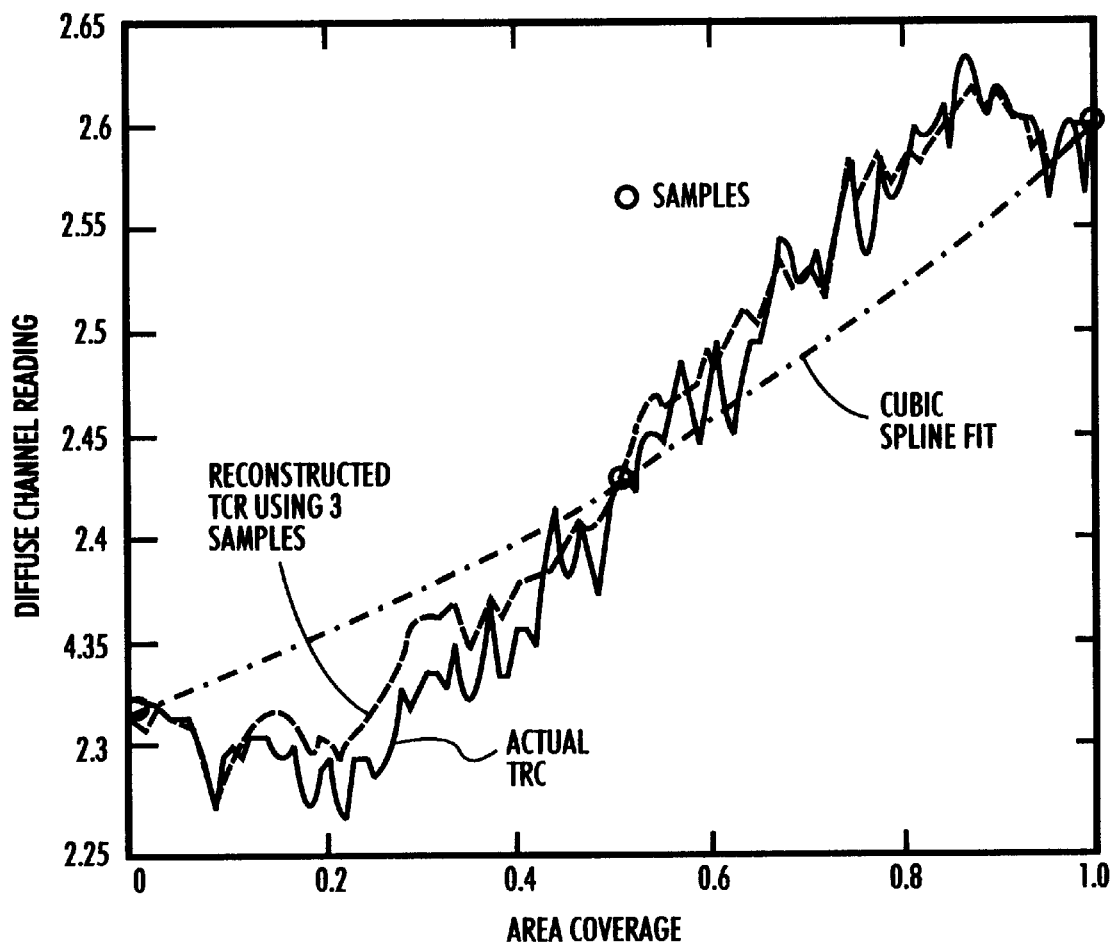
FIG. 4 is a second example of reconstructed TRC in accordance with the present invention compared to an actual TRC and a cubic spline fit TRC.

The look up table matrix was generated using equation 7 after obtaining $\Omega$ matrix with all 121 TRCs. All the results shown below are for raw diffused channel data. The procedure is applicable to specular data also, either in isolation or in combination with the diffused data. After obtaining the lookup table, TRC's were reconstructed with 3 samples using equation 5. FIGS. 3 and 4 illustrate the results for two different cases.

Validation studies were performed over the experimental data to confirm the superior reconstruction capabilities in accordance with the present invention. In particular, the original data set of $N_o$=121 TRC curves was divided into two disjoint populations—$N_f$, a sub-population "fitting data" to be used to obtain the lookup table ($\Pi^+$ matrix) using equation 7, and $N_p$, a sub-population to be used as test data. Then the resulting lookup table ($\Pi^+$ matrix) was applied to $N_p$ to assess the quality and predictive nature of the representation.

It was necessary to insure that $N_p$ was large enough to ensure a good fit, but not so large that the prediction test population, $N_p$ is uselessly small. Criterion of adequate fit is based upon the ratios of mean square errors as follows. Given a population, N, of DRC data, define the mean total sum of squares to be MST:=SST|N where the total sum of squares is defined by $$SST := \sum_{i=1}^{N} \|C_i - \overline{C}\|^2. \tag{8}$$

Further given a reconstruction procedure and a set of DRC curves, define the mean error sum of squares to be MSE:= SSE|N where the error sum of squares is defined $$SSE := \sum_{i=1}^{N} \|\hat{C}_i - C_i\|^2, \tag{9}$$

and $\hat{C}_i$ is computed by using equation 5 above. Thus, $MSE_o$ will denote the MSE resulting from using N=$N_o$, $MSE_f$ will denote the MSE resulting from applying the reconstruction procedure to the fitting population, $N_f$, and $MSE_p$ to be the MSE resulting from applying the reconstruction procedure to the test data, $N_p$. We will make sure that the fitting population percentage, $N_f/N_o$ is sufficiently large that $MSE_f/MSE_o$ is within 10 percent of unity.

Given an adequate fit relative to the original population, it is now possible to assess the predictive capability of the reconstruction by considering the various mean squared errors—that of the predictive population being the most important. We expect (except under peculiar arrangements of data within the populations) that $MSE_f$ should be smaller than $MSE_p$. However, a much smaller $MSE_f$ casts suspicion on the predictive adequacy of the proposed reconstruction.

The results of six different randomized cross validation studies comparing the spline fit methods of reconstruction with that of optimal reconstruction according to the present invention showed higher accuracy and predictive capabilities for optimal reconstruction. For each of six pairs of rows, a fitting population of size, $N_f$=85 was chosen at random from the original. FIGS. 3 and 4 illustrate examples of the relationship of actual TRC, reconstructed TRC, and cubic spline fit.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a printing machine having a moving imaging surface, a projecting system for modulating a beam and projecting an image onto the imaging surface, a developer for application of toner to the image projected onto the imaging surface for transfer of the image to a medium, a method of machine control comprising the steps of;

providing a look up table for reconstructing a tone reproduction curve (TRC), the look up table comprising a covariance matrix of elements containing n tone reproduction samples wherein n is a positive integer used to represent the TRC samples, providing a discrete number of sensed samples, responding in a matrix multiplier to the sensed samples and the look up table to reproduce a tone reproduction curve, and responding to the reproduced tone reproduction curve in a control to adjust machine quality.

2. The method of claim 1 wherein the look up table is defined by the matrix $\Pi^+ = \Sigma\Pi(\Pi^T\Sigma\Pi)^{-1}$ where sigma is the covariance matrix of elements containing n tone reproduction samples wherein T represents the transpose of the matrix.

3. The method of claim 2 wherein the matrix $\Pi^+ = \Sigma\Pi (\Pi^T\Sigma\Pi)^{-1}$ incorporates an estimated linear reconstruction defined by $\hat{C} := \Pi^+ c$ where $\Pi^+$ represents a least squares optimal reconstruction where c represents the TRC vector.

4. The method of claim 1 wherein the step of adjusting machine quality includes the step of adjusting one of the imaging surface voltage, developer bias voltage or projecting system power.

5. In a printing machine having a moving imaging surface, a projecting system for modulating a beam and projecting an image onto the imaging surface, a developer for application of toner to the image projected onto the imaging surface for transfer of the image to a medium, a method of machine control comprising the steps of;

providing a look up table for reconstructing a tone reproduction curve (TRC), sensing a discrete number of machine samples, responding in a matrix multiplier to the sensed samples and to the look up table to reproduce the tone reproduction curve, and responding to the tone reproduction curve to adjust machine quality, the look up table comprising a covariance matrix of elements determined by denoting a matrix resulting from an N set of output tone reproduction curve measurements, as $$\Omega := [C_1 \ C_2 \ldots C_N] \epsilon R^{n \times N},$$

where $C_1, C_2 \ldots$ etc., are the vectors of elements containing n TRC samples covering a whole TRC space wherein n is a positive integer used to represent TRC samples, N represents TRC measurements obtained from input/out experiments, and R represents Euclidean spaces, specifying an associated sample covariance matrix as $$\Sigma := {}^{1+i}/_N \Omega \Omega^T,$$

wherein T represents the transpose of the matrix, assuming a fixed set of sample points and defining a TRC vector c as $$c := \Pi^T C$$

where each column of $\Pi$ denoting a matrix with each column vector containing zeros with a single unity value placed in the slot corresponding to the quantized value at which the TRC is sampled by the sensor, is a vector of zeros with a single unity value in a slot corresponding to the quantized value at which the TRC is to be sampled, and C corresponds to all the elements of the TRC, providing a least squares optimal reconstruction, $\Pi^+$ denoting a matrix used as a look up table as the sensor complement in the TRC reconstruction process, with respect to a given set of N sample vectors that form the columns of $\Omega$ defined as $$\hat{C} := \Pi^+ \Pi^T C$$

obtaining $\Pi^+$ by minimizing the Frobenius norm of $$\Omega - \Pi^+ \Pi^T \Omega$$

resulting in a matrix look up table for use in a TRC reconstruction process defined by $$\Pi^+ = \Sigma\Pi(\Pi^T\Sigma\Pi)^{-1}.$$

6. A smart sensor for use in adjusting quality in an imaging machine comprising;

a look up table for reconstructing a tone reproduction curve (TRC), means for measuring machine parameters, and a matrix multiplier responsive to the machine parameters and to the look up table to reproduce the tone reproduction curve, the look up table comprising a covariance matrix of elements determined by denoting a matrix resulting from an N set of output tone reproduction curve measurements, as $$\Omega := [C_1 \ C_2 \ldots C_N] \epsilon R^{n \times N},$$

where $C_1, C_2 \ldots$ etc., are the vectors of elements containing n TRC samples covering a whole TRC space wherein n is a positive integer used to represent TRC samples, N represents TRC measurements obtained from input/out experiments, and R represents Euclidean spaces, assuming a fixed set of sample points and defining a TRC vector c as $$c := \Pi^T C$$

where each column of $\Pi$ denoting a matrix with each column vector containing zeros with a single unity value placed in the slot corresponding to the quantized value at which the TRC is sampled by the sensor, is a vector of zeros with a single unity value in a slot corresponding to the quantized value at which the TRC is to be sampled, and C corresponds to all the elements of the TRC, providing a least squares optimal reconstruction, $\Pi^+$ denoting a matrix used as a look up table as the sensor complement in the TRC reconstruction process, with respect to a given set of N sample vectors that form the columns of $\Omega$ defined as $$\hat{C} := \Pi^+ \Pi^T C$$

resulting in a matrix look up table for use in a TRC reconstruction process defined by $$\Pi^+ = \Sigma\Pi(\Pi^T\Sigma\Pi)^{-1}.$$

7. A smart sensor system for use in adjusting control parameters in an imaging machine comprising;

a look up table for reconstructing said control parameters, a sensor for obtaining control parameter data, and a matrix multiplier responsive to minimal sensor measurements and to the look up table to reconstruct the control parameters, the look up table comprising a covariance matrix of elements determined by denoting a matrix resulting from an N set of output tone reproduction curve measurements, as $$\Omega := [C_1 \ C_2 \ldots C_N] \epsilon R^{n \times N},$$

where $C_1$, $C_2$ ... etc., are the vectors of elements containing n TRC samples covering a whole TRC space wherein n is a positive integer used to represent TRC samples, N represents TRC measurements obtained from input/out experiments, and R represents Euclidean spaces.

8. The sensor system of claim 8 wherein a fixed set of sample points is assumed and a TRC vector c is defined as $$c := \Pi^T C$$

wherein T represents the transpose of the matrix where each column of $\Pi$, denoting a matrix with each column containing zeros with a single unity value placed in a slot corresponding to the quantized value at which the TRC is sampled, is a vector of zeros with a single unity value in a slot corresponding to the quantized value at which the TRC is to be sampled, and c corresponds to all the elements of the TRC.

9. The sensor system of claim 8 wherein a least squares optimal reconstruction, $\Pi^+$, is provided with respect to a given set of N sample vectors that form the columns of $\Omega$ defined as $$\hat{C} := \Pi^+ \Pi^T C$$

resulting in a matrix look up table for use in a TRC reconstruction process defined by $$\Pi^+ = \Sigma \Pi (\Pi^T \Sigma \Pi)^{-1}$$

... the sigma PI expression represents a sample covariance matrix.

10. In an imaging machine having an imaging surface, a system for projecting an image onto the imaging surface, given control parameters, said given control parameters including a tone reproduction curve, and a developer for application of toner to the image projected onto the imaging surface, a method of machine control comprising the steps of;

providing a look up table for reconstructing said control parameters, providing a discrete number of sensed samples, and responding in a matrix multiplier to the sensed samples and the look up table to reconstruct the control parameters.

11. The imaging machine of claim 10 wherein said given control parameters include a developability curve.

12. The imaging machine of claim 10 wherein the look up table includes a covariance matrix of elements.

13. The imaging machine of claim 10 including the step of responding to the reconstructed control parameters to adjust machine quality.

14. In an imaging machine having a moving imaging surface, a projecting system for modulating a beam and projecting an image onto the imaging surface, a developer for application of toner to the image projected onto the imaging surface for transfer of the image to a medium, a method of machine control comprising the steps of;

providing a look up table for reconstructing a tone reproduction curve (TRC), providing a minimal number of sensed samples, responding in a matrix multiplier to the sensed samples and the look up table to reproduce a tone reproduction curve representative of the imaging machine, and responding to the reproduced tone reproduction curve in a control to adjust machine quality.

15. The method of claim 14 wherein the look up table comprises a matrix of elements representing the image machine operating data.

16. The method of claim 14 wherein the look up table is defined by the matrix $\Pi^+ = \Sigma \Pi (\Pi^T \Sigma \Pi)^{-1}$ where sigma is the covariance matrix of elements containing n tone reproduction samples wherein n is a positive integer used to represent the TRC samples and wherein T represents the transpose of the matrix.

17. The method of claim 14 wherein the matrix $\Pi^+ = \Sigma \Pi (\Pi^T \Sigma \Pi)^{-1}$ incorporates an estimated linear reconstruction defined by $\hat{C} := \Pi^+ c$ where $\Pi^+$ represents a least squares optimal reconstruction and c represents the TRC vector.

18. A smart sensor system for use in adjusting control parameters in an imaging machine comprising;

a look up table for reconstructing said control parameters, a sensor for obtaining control parameter data, a matrix multiplier responsive to sensor measurements and to the look up table to reconstruct the control parameters, and a control responding to the reconstructed control parameters to adjust machine quality wherein said given control parameters include a tone reproduction curve.

* * * * *